Jan. 23, 1934.   J. H. RIEDLING   1,944,271
LINT STRIPPER
Filed June 6, 1932   2 Sheets-Sheet 1
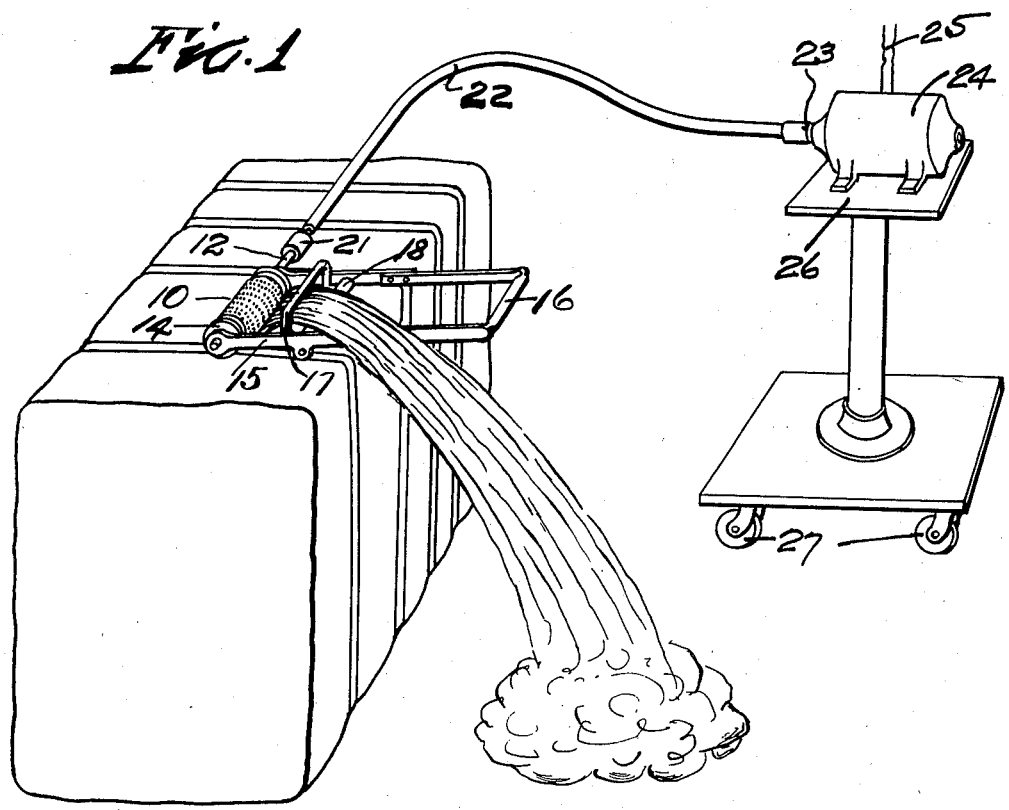

Jan. 23, 1934.     J. H. RIEDLING     1,944,271
LINT STRIPPER
Filed June 6, 1932     2 Sheets-Sheet 2
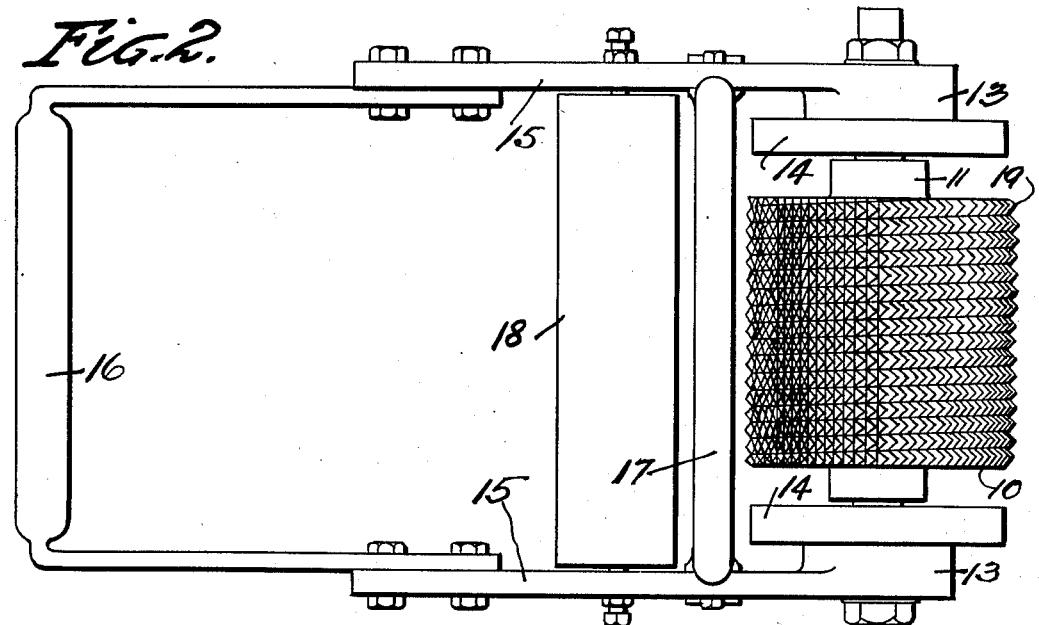
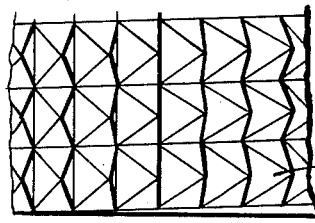
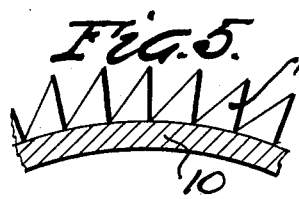 
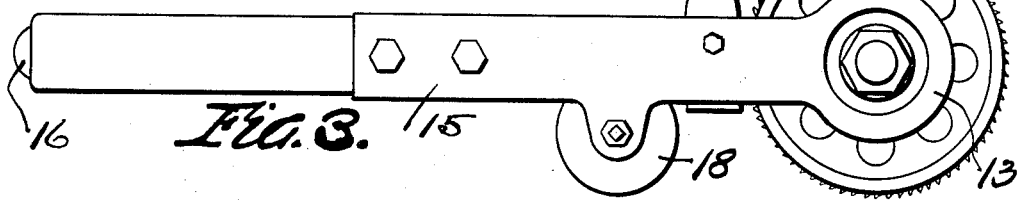
INVENTOR
John H. Riedling
by J H Weatherford
ATTY.

Patented Jan. 23, 1934

1,944,271

UNITED STATES PATENT OFFICE 1,944,271

LINT STRIPPER

John H. Riedling, Memphis, Tenn.

Application June 6, 1932. Serial No. 615,623

8 Claims. (Cl. 28—1)

This invention relates to devices for stripping lint from the outer surfaces of bales or packages of fibrous material. It has particular reference to a device for stripping lint from the outer surface of a bale of cotton in order to remove from such bale damaged or discolored portions of the material.

It often happens that the surface of a bale of cotton is damaged by fire or becomes discolored through exposure to the weather or dirty through careless handling. In such case it is advisable, if not absolutely necessary, that the damaged surface cotton be removed in order that the remaining undamaged cotton of the bale be not lowered in grade because of such surface damage. The present device is designed for the ready and efficient accomplishment of such purposes.

The objects of this invention are:

To provide a device which will rapidly and efficiently remove such surface lint;

To provide a device in which the removing instrumentality will be supported against excessive gouging or digging into the bale;

To provide a device which may be readily moved and shifted and as readily directed toward those portions of the bale most needing treatment; and To provide a device which will efficiently cover in minutest detail and rapidly shifting relation the surface against which it is directed, and which will automatically free itself from the material removed.

The means by which the foregoing and other objects are accomplished and the manner of their accomplishment will readily be understood from the following specification on reference to the accompanying drawings, in which:

Fig. 1 is a perspective view of the device in use upon a bale of cotton;

Fig. 2 is a plan view and Fig. 3, a side elevation on a larger scale of the stripper; and Figs. 4, 5 and 6 are enlarged views of a fragmentary portion of the stripper drum showing detail of the teeth.

Referring now to the drawings in which the various parts are indicated by numerals, 10 is a cylindrical drum preferably having projecting hubs 11. This drum is mounted on and secured to a shaft 12, which shaft is journalled in suitable bearings 13. Also mounted on and freely rotatable about the shaft 12 are discs or short rollers 14 which are disposed at the ends of the drum between the hubs 11 and the bearings 13. These discs are preferably of slightly greater diameter than the drum body but less than its diameter over the teeth thereon.

The bearings 13, are carried by a U shaped frame having side bars 15, each of which carries a bearing, and a transverse grip portion 16. 17 is a U shaped handle the legs of which are secured to the side bars 15 and which handle extends vertically upward furnishing means by which the device may be lifted to move it from place to place on the bale. 18 is a cylindrical roller which is journalled in the frame sides 15.

Projecting from the cylindrical surface of the drum 10, are teeth 19, which are arranged in a helical row around the drum and preferably in longitudinal rows parallel to the axis of the drum.

It will be understood that the helical arrangement may be either a single helix forming in effect a single screw thread throughout the length of the drum or two or even more helices.

In Figs. 4, 5 and 6 is shown the preferred form of the teeth. These views show pyramidal teeth, square in cross section and forwardly inclined so that their forward faces extend radially outward from the drum with the back of each sloping to the root of the next rearward tooth. Such teeth may be made by cutting a V shaped thread from end to end of the drum, and cutting transversely across these threads along lines parallel to the axis of the drum with a V shaped cutter.

The shaft 12 is provided with a key-way 20, so that it may be connected as by a coupling 21 and a flexible shaft 22 to the shaft 23 of an electric motor 24. 25 are the current wires.

When so connected the drum is rotated at the same speed as the motor, preferably an 1800 R. P. M. motor being used. Also the motor is preferably mounted on a stand 26, provided with casters or rollers 27 so that it may be shifted from place to place to permit access to various parts of the bale or bales.

In using the device it is ordinarily supported by the handle and the current turned on to the motor. As soon as it has reached full speed the drum is moved into contact with the bale. Control of the device is accomplished by means of the grip and handle. Ordinarily the roller 18 is brought to rest on the bale and thereafter the drum moved into working contact. When so brought into contact the discs 14 tend to prevent gouging. Lint removed is thrown outward and released from the teeth by centrifugal force and is also longitudinally diverted by the spiral action of the helically disposed teeth so that the lint removed is directed away from the operator handling the device, this being true whether the teeth are set to strip toward or away from the operator. Stripping is continued until all damaged cotton is removed, it being ordinarily necessary to go over the surface of the bale two or more times in order to accomplish this. Lint removed is pulled off in minute quantities and is thrown onto a loose fluffy pile and in many cases is in condition for certain uses without further treatment. If the damage is caused by water and the cotton is wet the loosening of the fiber is of material assistance in the subsequent drying out process.

Having described my invention, what I claim is:

1. In a device for stripping lint from bales of fibrous material or the like, a manually portable frame carrying a rotatable drum having teeth projecting therefrom, freely rotatable supports for said frame at the respective ends of said drum, said supports having relatively narrow treads, and means for rotating said drum.

2. In a device for stripping lint from bales of fibrous material or the like, a manually portable frame carrying a rotatable drum having teeth projecting from the periphery thereof, freely rotatable supports for said frame at the respective ends of said drum and coaxial therewith, said supports having relatively narrow treads and being of greater diameter than that of said drum at the base of said teeth, and means for rotating said drum.

3. In a device for stripping lint from bales of fibrous material or the like, a manually portable frame carrying a rotatable drum having teeth projecting from the periphery thereof, freely rotatable supports for said frame at the respective ends of said drum and co-axial therewith, said supports having relatively narrow treads and being of less diameter than that of said drum as measured over the extremities of said teeth, and means for rotating said drum.

4. In a device for stripping lint from bales of fibrous material or the like, a manually portable frame carrying a rotatable drum having teeth projecting from the periphery thereof, freely rotatable supports for said frame at the respective ends of said drum, said supports having relatively narrow treads, and being so disposed that a plane tangent to said treads at the lowest point of each thereof passes below the periphery of said drum at the base of said teeth, and means for rotating said drum.

5. In a device for stripping lint from bales of fibrous material or the like, a manually portable frame carrying a rotatable drum having teeth projecting from the periphery thereof, freely rotatable supports for said frame at the respective ends of said drum, said supports having relatively narrow treads, and being so disposed that a plane tangent to said treads at the lowest point of each thereof passes through the periphery of said drum as defined by the extremities of said teeth, and means for rotating said drum.

6. In a device for stripping lint from bales of fibrous material or the like, a manually portable frame carrying a rotatable drum having teeth projecting therefrom, a freely rotatable support for said frame, at one side of and having its axis parallel with that of said drum, said support having a relatively wide tread, freely rotatable supports at the respective ends of said drum, said last-named supports having relatively narrow treads, and means for rotating said drum.

7. In a device for stripping lint from bales of fibrous material or the like, a manually portable frame carrying a rotatable drum having teeth projecting therefrom, a plurality of freely rotatable supports for said drum, said supports being so disposed that a plane tangent thereto at the lowest points of the treads thereof passes between the periphery of said drum at the base of said teeth and the circumference of a circle defined by rotation of the extremity of any one of said teeth, and means for rotating said drum.

8. In a device for stripping lint from bales of fibrous material or the like, a manually portable frame carrying a rotatable drum having teeth projecting therefrom, said teeth being helically arranged on the periphery of said drum, whereby said drum and teeth are adapted to produce the effect of a helical unit upon rotation thereof, a freely rotatable support for said frame, means for moving said frame manually on said support, and means for rotating said drum.

JOHN H. RIEDLING.